(12) United States Patent
Fanshier

(10) Patent No.: US 7,526,764 B2
(45) Date of Patent: Apr. 28, 2009

(54) SYSTEM AND METHOD FOR DEPLOYMENT PLAN

(75) Inventor: Stephen R. Fanshier, San Diego, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 396 days.

(21) Appl. No.: 10/848,422

(22) Filed: May 18, 2004

(65) Prior Publication Data

US 2006/0041643 A1    Feb. 23, 2006

(51) Int. Cl.
*G06F 9/445* (2006.01)
(52) U.S. Cl. ...................................................... 717/174
(58) Field of Classification Search .................. 717/174
See application file for complete search history.

(56) References Cited

U.S. PATENT DOCUMENTS

| 7,069,553 B2 * | 6/2006 | Narayanaswamy et al. | . 717/173 |
| 2003/0225851 A1 * | 12/2003 | Fanshier et al. | ............. 709/208 |

OTHER PUBLICATIONS

BEA WebLogic Server : Assmbling and Configuring Web Application Aug. 20, 2003.*
BEA WebLogic Server™ ("Developing WebLogic Server Application") Aug. 2002.*
BEA WebLogic Server™ ("Assembling and Configuring Web Applications")Aug. 2002.*
BEA WebLogic Server ("Developing WebLogic Server Applications") Release 7.0, Document revised Aug. 20, 2002.*
BEA WebLogic Server ("Assembling and Configuring Web Applications") Release 7.0, Document revised Aug. 20, 2002.*
BEA WebLogic Server ("Developing WebLogic Server Applications") Release 7.0, Document revised Aug. 20, 2002.
BEA WebLogic Server ("Assembling and Configuring Web Applications") Release 7.0, Document revised Aug. 20, 2002.
http://web.archive.org/web/*/http://edocs.bea.com/wls/docs70/pdf/programming.pdf, accessed Aug. 20, 2008.

* cited by examiner

*Primary Examiner*—Wei Y Zhen
*Assistant Examiner*—Junchun Wu
(74) *Attorney, Agent, or Firm*—Fliesler Meyer LLP

(57) ABSTRACT

A system and method for implementing a deployment plan for an application server environment. In one embodiment, the deployment plan is an XML document that can be associated with any application that is deployed to an application server environment. The deployment plan may incorporate all server (vendor) specific deployment information as required by JSR-88 as well as the application configuration attributes that need to be resolved for each application server environment to which that application is deployed. Additionally, it can contain references to custom module descriptors.

15 Claims, 1 Drawing Sheet

SYSTEM AND METHOD FOR DEPLOYMENT PLAN

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to deployment plans on application server systems.

BACKGROUND OF THE INVENTION

Moving J2EE applications from one environment to another by Administrators is currently nontrivial. In addition to the difficulty in determining the external resource requirements of an application, it is also difficult to provide appropriate resolutions for these resources in a convenient manner. These resolutions need to be added to the descriptors of the application. At this point, the Administrator is in Developer territory and is faced with a daunting task of having to unpack the application (something that the administrator would rather not do), determine the appropriate descriptor and the appropriate attribute within the descriptor to modify, and ensure that this is done without any mistakes. The main reason for this difficulty is that application composition related information and application configuration information are all present in the descriptors with separate distinctions being made.

A similar portability problem exists in moving an application from one J2EE application server environment to another. What is needed is a deployment plan that addresses the problems and shortcomings of the prior art.

SUMMARY OF THE INVENTION

The present invention provides a deployment plan for an application server environment. In one embodiment, the deployment plan is an XML document that can be associated with any application that is deployed to an application server environment. The deployment plan may incorporate all server (vendor) specific deployment information as required by JSR-88 as well as the application configuration attributes that need to be resolved for each application server environment to which that application is deployed. Additionally, it can contain references to custom module descriptors.

A deployment plan is the primary output of a JSR-88 deployment configuration session or as a result of an explicit phase of application development that exports or prepares an application deployed on a development application server domain for export to a staging or production domain. The plan may also be provided as input to a deployment session, much the same as the application server descriptors are inputs. The deployment session does not make changes to the descriptors. Rather, the descriptors are used solely as input.

DETAILED DESCRIPTION

Figure 1:
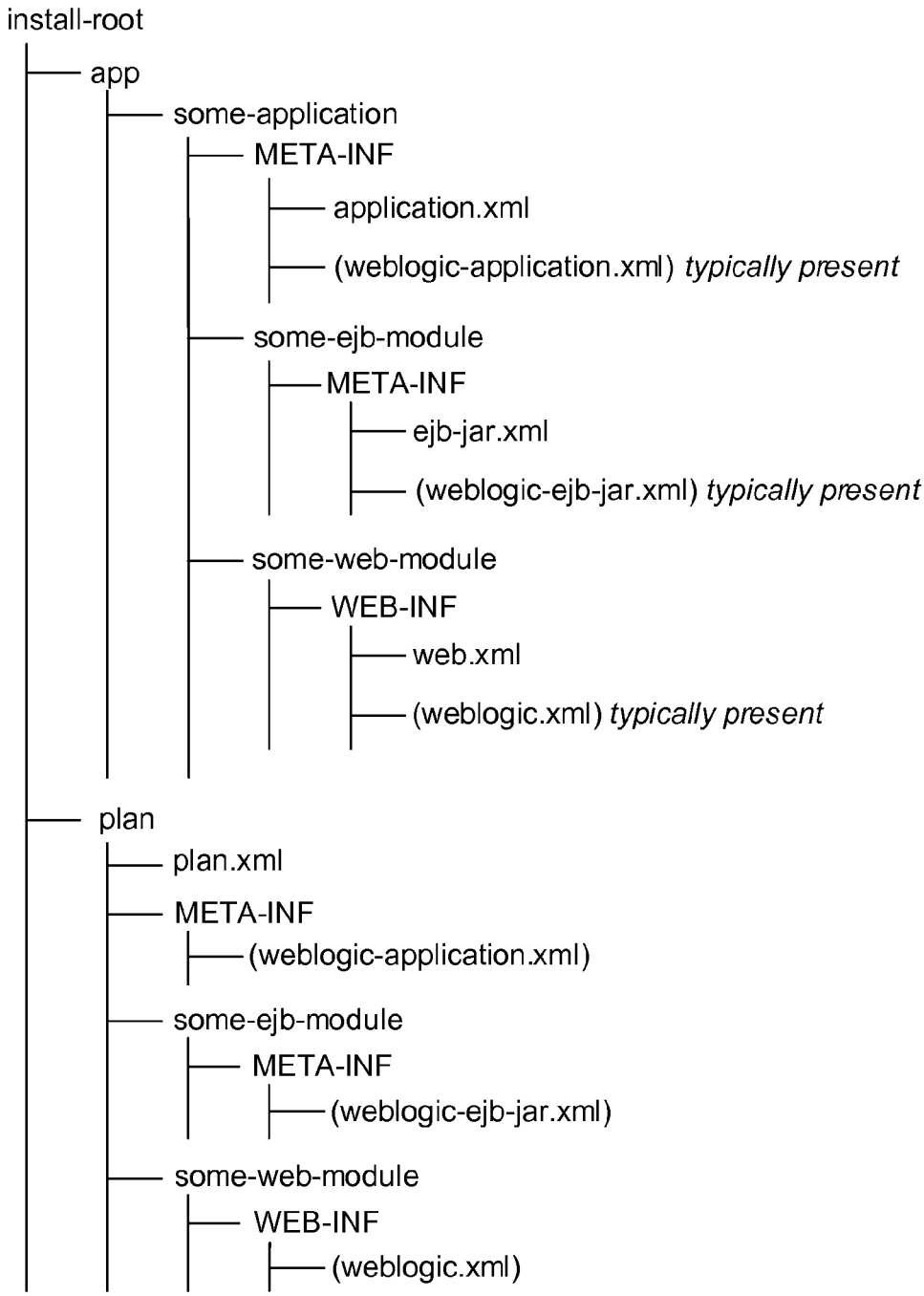
FIG. 1 is an illustration of a plan document in accordance with one embodiment of the present invention.

The present invention includes a deployment plan. In one embodiment, the deployment plan is an XML document that can be associated with any application that is deployed to an application server environment. In one embodiment, the application server environment may be WebLogic Server (WLS) of BEA Systems, of San Jose, Calif. Though the embodiments of the present invention will often be discussed with reference to WLS, it is for exemplary purposes only. The scope of the deployment plan of the present invention is intended to cover other application server systems and environments as well. The deployment plan may incorporate all server (vendor) specific deployment information as required by JSR-88 as well as the application configuration attributes that need to be resolved for each WebLogic environment to which that application is deployed. Additionally, it can contain references to custom module descriptors.

A deployment plan is the primary output of a JSR-88 deployment configuration session or as a result of an explicit phase of application development that exports or prepares an application deployed on a development WebLogic domain for export to a staging or production domain. The plan may also be provided as input to a deployment session, much the same as the WLS descriptors are inputs. The deployment session does not make changes to the descriptors. Rather, the descriptors are used solely as input.

Application Directory

In one embodiment, applications can be organized in a more formal manner through an application directory. In systems of the prior art, an application was solely located by its path, a reference to the application archive file or directory. For backwards compatibility, having only a path to an application is still supported. Thus user's will not have to change existing configurations, scripts or paths to applications, and they may still deploy in the deployment plan and application server system of the present invention.

The new directory structure is:
   install directory
      application directory
      plan directory In one embodiment, in the interface used to introduce an application to WLS, the user may specify the installation root of the application rather than a path to its archive. An archive-only based interface will also be provided for backward compatibility and for pure development environments (such as the auto-deploy applications directory.)

In the common (and most simple) case the application directory looks like:

```
install-root <dir>
  |
  | - app <dir>
  |   |
  |   | - archive
  |
  | - plan <dir>
  |   |
  |   | - plan.xml
  |   |
  |   | - external-descriptors <dirs>
```

The 'install-root' directory is typically named after the application, and is the parent directory for all application artifacts. The app directory is a directory whose content is the application archive or root directory of an exploded archive, otherwise referred to as archive. The plan directory is another directory and the root of JSR-88 configuration information, which consists of the deployment plan document and some number of external descriptors.

A configured application will have an AppDeploymentMBean that contains references to these locations. In one embodiment, the system configuration will have the paths relative to the install-root. Thus, the relative path to the archive can be absolute or just app/app-ame. Similarly the relative path to a deployment plan, plan.xml, would be plan/plan.xml and its resolved path is install-root/plan/plan.xml. The references for app and plan directories may also be absolute, in which case install-root is not supplied, but this is an edge case scenario. This scenario can occur when the app is not being staged on the target servers. The staging process will ensure the installation root hierarchy regardless of the source configuration of the application. Similarly, uploading an application to the admin server will result in the application being organized into the installation root hierarchy on the admin server. In one embodiment, the AppDeploymentMBean has the following attributes and the default or common behavior:

InstallDir—path to application's install-root directory, relative to the domain/config/deployments directory.

SourcePath—path to application archive, relative to installdir/app directory

Plan Dir—installdir/plan directory

PlanPath—path to deployment plan relative to plandir

Configuration Process Overview

When an application is presented to an application configuration utility, it can have a variety of forms. In one embodiment, the artifacts of an application that are of interest are its descriptors. For standard modules, these are the standard J2EE deployment descriptors. These descriptors externalize resource references that require resolution before a deployment can be successful. In the past, this resolution was satisfied solely by deployment descriptors. JSR-88 introduces the deployment plan concept which is an attempt to standardize a mechanism for resolving resource references. The deployment plan in one embodiment of the present invention satisfies the spirit of JSR-88 while extending it with the ability to provide for a flexible means of moving applications between environments, and applying constraints on the changeable attributes of an application that may be changed by an administrator without having to change the descriptors, which in production are typically inside an archived EAR.

Properties in the various descriptors are defined either as non-configurable, configurable, dependency or published properties.

Non-configurable—properties that cannot be modified by an administrator, eg weblogic-ejb-jar/weblogic-enterprise-bean/ejb-name Configurable—properties that may be modified by an administrator but are not dependency or published properties, eg weblogic-web-app/servlet-descriptor/run-as-principal-name Dependency—properties that resolve resource references, eg weblogic-web-app/resource-description/jndi-name Published—properties that resolve resource definitions, eg weblogic-ejb-jar/weblogic-enterprise-bean/jndi-name Changeable properties are therefore those that are configurable, dependency or published. Thus, changeable properties may be any property that may be changed by an administrator.

Changeable properties may also be qualified as dynamic or non-dynamic (default). Dynamic properties are those which may be modified at run time without losing modules' session state.

Deployment plans may not allow for modifications to any property that is not changeable. In one embodiment, properties in the weblogic configuration descriptors may be changeable, although there is allowance for a subset of standard descriptor properties that may be modified by an administrator.

The typical scenario is two descriptors per module: one for definitions (the standard descriptor), and the other for configuration (vendor specific descriptors, also known generically by JSR-88 as configuration descriptors, hence DConfigBeans). Certain module types which don't follow this pattern may have a descriptor that satisfies both definition and configuration. JMS and JDBC and config modules fall into this category. This does not imply they are not covered by the configuration process, only to state that all configuration overrides are made via variable assignments.

In one embodiment, with regard to the configuration process some simple rules may be used:
 1. If a configuration descriptor does not exist, one will be created and placed in the application's plan directory; and
 2. If a configuration descriptor already exists in the module it will not be modified. Any changes to its properties will be reflected in variable assignments in the plan.

The output of a configuration process is a plan document and possibly some number of external descriptors. Deployment processing on the application will look inside an archive for WLS specific descriptors before using any external descriptors. Any variable assignments defined for the descriptor are applied regardless of where the descriptor resides.

The plan contains references to configuration information associated with an application. These references are paths to configuration descriptors (WLS). The paths are relative to the Application's plan directory (AppDeploymentMBean.PlanDirectory) or the application root. Thus the paths are consistent regardless of whether they are in the plan directory or the application. The structure of the plan directory follows the structure of the application's deployment descriptors, all of which are illustrated in plan 100 of FIG. 1. Descriptors in the plan directory are used in the event that the corresponding module does not already have the descriptor. For example, plan/META-INF/weblogic-application.xml is used to configure an EAR if some-application/META-INF/weblogic-application.xml is not present. In one embodiment, the plan directory is not used for standard descriptors.

In one embodiment, a JSR-88 based tool is used to configure an application. The output of such a session is a deployment plan and the plan directory described above. The standard JSR-88 API provides no means for specifying the location of the plan directory or the application's installation root. The WLS implementation of DeployableObject will allow the tool to specify the installation root of an application. If not specified, then the default installation root is defined to be $TEMP/weblogic-install/application-name. The deployment plan created via DeploymentManager.save(OutputStream) will write the plan document to the provided stream, as well as populating the installation root with weblogic descriptors (unless they are already in the archive). The local path to the installation directory will be specified in the plan document.

When an application is distributed, the archive, plan and plan directory(s) will be uploaded as necessary to the admin server and then propagated to managed servers. The installed plan will contain the relative paths to any configuration descriptors (WLS) that exist in the plan directory. These external descriptors are not to be confused with alt-dd's. They may be used in the absence of a configuration descriptor existing in the application.

A module may incorporate the use of secondary deployment descriptors. Web services is a typical example of this. In this scenario the configuration tool will automatically query for the presence of a secondary descriptor known to have an association with a particular module type. If such a descriptor exists, then it will be processed much the same as for a standard module deployment descriptor. The result would be the corresponding weblogic configuration descriptor associated with the secondary descriptor, which will be saved to the module's plan directory. Hence the plan directory may contain multiple descriptors, each of which is referenced by the deployment plan.

External Descriptors

Descriptors are a file in an application that describes how the application behaves and can be administered. Previously, descriptors were always inside the application. To change the external behavior or to move the application from one environment to another, the application had to be changed. In one embodiment, the present invention moves the descriptors outside the application so the administrator does not have to change the application itself.

If during a configuration session a configuration (WLS) descriptor is created, it will be saved in a plan directory associated with the resulting deployment plan. The plan will include the plan directory's path and URIs for each module descriptor.

```
<?xml version="1.0" encoding="UTF-8" standalone="yes"?>
<deployment-plan xmlns="http://www.bea.com/schemas/weblogic">
    <application-name>test</application-name>
    <module-override>
        <module-name>MyApp</module-name>
        <module-type>war</module-type>
        <module-descriptor>
            <uri>WEB-INF/weblogic.xml</uri>
        </module-descriptor>
    <config-root>c:/myapps/MyApp/plan</config-root>
</deployment-plan>
```

This example shows that there is a descriptor with URI, WEB-INF/weblogic.xml, for web module, MyApp. It's important to note that the descriptor may be in the app or external (in the plan directory). In one embodiment, descriptors that are not external and have no variable assignments may not be included. If the descriptor is external, then it would be found in the application's plan directory.

The config-root element identifies the plan directory as it exists on the client system only. It is used when an application is being deployed such that the deployment framework can locate the plan directory of the application. Once deployed, the plan directory is located from server-side classes via the application's AppDeploymentMBean.

Variable Support

In one embodiment, variable support provides for a finer grain of control over what an administrator can change, or initiate to be changed (external descriptors change pieces of it). The variables map to properties that are in the descriptors. In one embodiment, the variables can be used in moving the application from one environment to another and to tune the application.

Deployment plans support the ability to override WebLogic as well as standard J2EE descriptors by using variables.

The variable section of the plan is a formatted list of name-value pairs

```
<?xml version="1.0" encoding="UTF-8" standalone="yes"?>
<deployment-plan xmlns="http://www.bea.com/schemas/weblogic">
    <application-name>test</application-name>
    <variable-definition>
        <variable>
            <name> "MyEJB" </name>
            <value> "jndi.ejb" </value>
            <description>This variable is used to identify the jndi name for an ejb</description>
        </variable>
    </variable-definition>
    <module-override>
        <module-name>MyApp</module-name>
        <module-type>war</module-type>
        <module-descriptor>
            <uri>WEB-INF/weblogic.xml</uri>
            <variable-assignment>
                <name>MyEjb</name>
                <xpath>weblogic-web-app/ejb-ref[ejb-ref-name=myejb]/jndi-name</xpath>
            <variable-assignment>
        </module-descriptor>
    </module-override>
    <config-root>c:/myapps/MyApp/plan</config-root>
</deployment-plan>
```

In the above example, the MyEJB variable is used to establish the JNDI name of an EJB, MyEJB. The definition says nothing about how the variable is used, only that it exists and has a value. The name is required while the value is optional. The variable-assignment element specifies that the value of MyEJB will be placed in the descriptor with URI, WEB-INF/weblogic.xml, at the location specified by the xpath expression.

Variables may be explicitly defined via the plan descriptor beans or automatically created as a result of modifying some value in a descriptor being managed by the plan. For each descriptor identified in the plan, any number of variable assignments may be applied. A declaration identifies the variable and the location within a descriptor where its value will be applied when the descriptor is parsed. The URI specifies the location of the descriptor, which may be either internal or external to the application. The URI is relative to the root of the application or the plan directory, whichever contains the target descriptor. The name property specifies the variable definition to be used. The xpath is the location in the descriptor where the variable's value will be placed. It is not considered an error if either the variable is not defined or has no value unless the property is a binding.

Variable assignments are applied during the parsing of a descriptor into a descriptor bean tree. For each variable assignment listed in the deployment plan for a descriptor, the variable is looked up by name and if it has a value that value is applied to the bean objects produced with appropriate type conversion and schema validation.

Secondary Descriptors

JSR-88 supports the notion of secondary descriptors. The descriptors can be part of any application and it is required that a configuration tool incorporate their configuration into the standard process. Web Services descriptors are examples of secondary descriptors and no special registration is required by the application developer to have them be part of the configuration process, other than to provide the descriptors.

Any number of RDBMS descriptors may be associated with an EJB module. The location of these descriptors is specified within the weblogic-ejb-jar.xml descriptor for the module. For each such descriptor named a secondary descriptor is added to the plan. An EJB with 2 RDBMS descriptors might have a plan as follows:

```
<?xml version="1.0" encoding="UTF-8" standalone="yes"?>
<deployment-plan xmlns="http://www.bea.com/schemas/weblogic">
   <application-name>test</application-name>
   <module-override>
      <module-name>MyEjb</module-name>
      <module-type>ejb</module-type>
      <module-descriptor>
         <uri>META-INF/weblogic-ejb-jar.xml</uri>
      </module-descriptor>
      <module-descriptor>
         <uri>META-INF/cmp11.xml</uri>
      </module-descriptor>
      <module-descriptor>
         <uri>META-INF/cmp20.xml</uri>
      </module-descriptor>
   </module-override>
   <config-root>c:/myapps/MyApp/plan</config-root>
</deployment-plan>
```

Configuration Module Support

In one embodiment, configuration module support allows developers to generate their own type of module and allows them to expand modules. Explicitly registered secondary descriptors are supported via the weblogic-extensions descriptor. Any such extension must include the following information to be incorporated into the configuration process:

root element tag of main descriptor
   root element tag of configuration descriptor
   URI of main descriptor
   URI of configuration descriptor
   package name of descriptor bean classes
   namespace used by the descriptors An example of registering a module of this type might look like

```
<weblogic-extension>
   <custom-module>
      <uri>mymodule</uri>
      <provider-name>fred</provider-name>
      <configuration-support>
        <base-root-element>annotation-manifest</base-root-element>
        <config-root-element>annotation-overrides</config-root-element>
        <base-namespace>http://www.bea.com/2004/03/wlw/external-config/</base-namespace>
        <base-uri>META-INF/manifest.xml</base-uri>
        <config-uri>META-INF/overrides.xml</config-uri>
        <base-package-name>weblogic.j2ee.descriptor.wl</base-package-name>
      </configuration-support>
   </custom-module>
</weblogic-extension>
```

JMS/JDBC

The JSR-88 ModuleType class will be extended to include both JMS and JDBC modules, and their descriptors will be included with the compiled-in descriptor support mechanism. Both JMS and JDBC use a single descriptor model. i.e. their "standard" descriptor is the same as their "configuration" descriptor. A JMS/JDBC descriptor must always be present in the application archive (or be the application archive). Any modifications to the descriptor made during a configuration session will be persisted as variable assignments in the resulting deployment plan.

Standard Descriptors

An administrator may need to change certain properties on standard descriptors. These properties can be tagged in the underlying descriptor bean interfaces that WLS uses to represent the standard descriptors as changeable. Modifications to the properties can be provided via variable assignments. The descriptor beans for standard descriptors and custom modules will be accessible via the WebLogicDeployment-configuration object. Configuration tools can then modify the bean properties directly, which will result in variable assignments being created for the descriptor.

Configuration Export and Import

The export/import process involves the tasks associated with moving an application between environments. The application is presumed (but not required) to be fully configured for the source environment. Thus, it has configuration descriptors embedded in the application. (In fact this is the most common scenario). It may already have a deployment plan referencing external descriptors in the application's configuration area, as well as making use of variable assignments.

Exporting an application ensures that a relevant subset of its configurable properties are advertised via variables such that reconfiguration by the receiving administrator (the import process) is a more straightforward process. The receiving administrator need not concern themselves with all the configuration artifacts, rather only those determined to be of importance. In one embodiment, an administrator may modify changeable properties that have variable assignments. Properties are either non-configurable, configurable, dependency or published, as defined by the defining descriptor interface. The export operations allow for any combination of changeable properties to be exported.

If the deployment plan does not expose certain properties via variable assignments, the configuration tool can recreate the plan using the export utilities such that more properties are exposed.

There are 3 modes of application configuration:
 1. basic JSR-88 configuration whereby an unconfigured application is provided with configuration descriptors (WLS descriptors);
 2. export configuration where a configured application is prepared for a new environment; and
 3. dynamic configuration of a deployed application The export configuration step involves taking an application with a full set of descriptors and possibly a deployment plan, and generating a new deployment plan that can be used by an administrator to easily introduce it into a new environment. The resulting deployment plan would expose configurable properties as variable assignments. If a plan already existed, then any variables for dependency properties would have their values removed, thus requiring the administrator to provide new ones. For situations where the plan is correct, or mostly correct, for the new environment, the export step can be skipped and the administrator can just take the existing plan as is.

Deployment Plan API and Schemas

Management of deployment plans is handled chiefly via the deployment API, which is based on JSR-88. This API is geared towards use by deployment tools and provides for creation, modification, validation and deployment of deployment plans. The basic API (JSR-88) provides tools with plan creation—when presented with an application a configuration (the deployment plan) is constructed. This plan is designed to ensuring that any references defined in the standard deployment descriptors are resolved.

application of plan in repository to applicationCthe tool can specify a specific plan to be used for application configuration.

weblogic descriptor creation—descriptors in the plans descriptor section can be saved as individual entities and later added to the application archive.

weblogic descriptor restoration—existing descriptors may be incorporated into the plan configuration access—descriptors in the plan are represented as a tree of java beans and may be accessed for viewing, editing, creating and removing.

The deployment API extends the above capabilities in support of variable substitution and management. The raw plan may be directly accessed by the tool and manipulated using the bean interfaces associated with the plan schema. This includes creation and removal of variable definitions;

creation and removal of variable assignments;

meta data queries on descriptor properties (isDynamic, isBinding, etc.); and queries on variable usage—where is variable used? what variable does a property use?

The deployment API is used as a configuration and deployment tool.

Merging Deployment Plan and J2EE Descriptor Information

During module prepare phase all descriptors are parsed. If a descriptor is not present in the archive an attempt will be made to find it in the application's plan directory. Consider the following application:

```
myapp
  app
    myapp
      META-INF
        application.xml
        weblogic-application.xml
      myejb
        META-INF
          ejb-jar.xml
  plan
    plan.xml
    META-INF
      weblogic-application.xml
      myejb
        META-INF
          weblogic-ejb-jar.xml
```

The standard descriptors should exist in the archive.

The weblogic-application.xml descriptor in the archive will be parsed. The weblogic-application.xml descriptor in the plan directory would be ignored. The weblogic-ejb-jar.xml for MyEJB is not in the archive, so the one in the plan directory will be used. Whichever descriptor is selected for parsing, any variable assignments associated with it will be applied from the plan during the parse.

EXAMPLE EMBODIMENTS

A production deployment example is illustrated below. An application with no plan is installed into a production environment and a configuration session for the application is completed with the binding of ejb1's JNDI name being supplied. (this example is more the mainstream common example than Example Two)

```
c:/mydomain/config/deployments/MyApp
  app
    MyApp
      META-INF
        application.xml
        weblogic-application.xml
      ejb1
        META-INF
          ejb-jar.xm
          weblogic-ejb-jar.xml
```

During a configuration session the resources in MyApp and ejb1 are bound. The resulting directory structure is

```
c:/mydomain/config/deployments/MyApp
  app
    MyApp
      META-INF
        application.xml
      ejb1
        META-INF
          ejb-jar.xml
  plan
    plan.xml
```

During configuration the JNDI name of the bean ejb1Bean was changed to jndi.ejb, the plan.xml would be

```
<?xml version="1.0" encoding="UTF-8" standalone="yes"?>
<deployment-plan xmlns="http://www.bea.com/schemas/weblogic">
    <application-name>MyApp</application-name>
    <variable-definition>
        <variable>
            <name> "WeblogicEnterpriseBean_ejb1Bean_JndiName"
            </name>
            <value> "jndi.ejb" </value>
            <description>This variable is used to identify the jndi name for an ejb</description>
        </variable>
    </variable-definition>
    <module-override>
        <module-name>MyApp</module-name>
        <module-type>ear</module-type>
        <module-descriptor>
            <uri>META-INF/weblogic-application.xml</uri>
        </module-descriptor>
    </module-override>
    <module-override>
        <module-name>ejb1</module-name>
        <module-type>ejb</module-type>
        <module-descriptor>
            <uri>META-INF/weblogic-ejb-jar.xml</uri>
            <variable-assignment>
                <name>WeblogicEnterpriseBean_ejb1Bean_JndiName</name>
                <xpath>weblogic-ejb-jar/weblogic-enterprise-bean[ejb-name="ejb1Bean"]/jndi-name</xpath>
            </variable-assignment>
        </module-descriptor>
    </module-override>
    <config-root>c:/mydomain/config/deployments/MyApp</config-root>
</deployment-plan>
```

The below session is an example of a configuration session for an application that does not have WLS descriptors. During a configuration, session WLS deployment descriptors are created.

```
            c:/myapps/MyApp
               app
                  MyApp
                     META-INF
                        application.xml
                     ejb1
                        META-INF
                           ejb-jar.xml
```

During a configuration session the resources in MyApp and ejb1 are bound. The resulting directory structure is

```
            c:/myapps/MyApp
               app
                  MyApp
                     META-INF
                        application.xml
                     ejb1
                        META-INF
                           ejb-jar.xml
                  plan
                     plan.xml
                     META-INF
                        weblogic-application.xml
                     ejb1
                        META-INF
                           weblogic-ejb-jar.xml
```

The plan.xml file would look as follows

```xml
<?xml version="1.0" encoding="UTF-8" standalone="yes"?>
<deployment-plan xmlns="http://www.bea.com/schemas/weblogic">
  <application-name>MyApp</application-name>
  <module-override>
    <module-name>MyApp</module-name>
    <module-type>ear</module-type>
    <module-descriptor>
      <uri>META-INF/weblogic-application.xml</uri>
    </module-descriptor>
  </module-override>
  <module-override>
    <module-name>ejb1</module-name>
    <module-type>ejb</module-type>
    <module-descriptor>
      <uri>META-INF/weblogic-ejb-jar.xml</uri>
    </module-descriptor>
  </module-override>
  <config-root>c:/myapps/MyApp</config-root>
</deployment-plan>
```

If the application was reconfigured using the above plan and the JNDI name of the bean ejb1Bean was changed to jndi.ejb, the directory structure would remain the same. The new plan.xml would be

```xml
<?xml version="1.0" encoding="UTF-8" standalone="yes"?>
<deployment-plan xmlns="http://www.bea.com/schemas/weblogic">
  <application-name>MyApp</application-name>
  <variable-definition>
    <variable>
      <name> "WeblogicEnterpriseBean_ejb1Bean_JndiName"
      </name>
      <value> "jndi.ejb" </value>
      <description>This variable is used to identify the jndi name for an ejb</description>
    </variable>
  </variable-definition>
  <module-override>
    <module-name>MyApp</module-name>
    <module-type>ear</module-type>
    <module-descriptor>
      <uri>META-INF/weblogic-application.xml</uri>
    </module-descriptor>
  </module-override>
  <module-override>
    <module-name>ejb1</module-name>
    <module-type>ejb</module-type>
    <module-descriptor>
      <uri>META-INF/weblogic-ejb-jar.xml</uri>
      <variable-assignment>
        <name>WeblogicEnterpriseBean_ejb1Bean_JndiName</name>
        <xpath>weblogic-ejb-jar/weblogic-enterprise-bean[ejb-name="ejb1Bean"]/jndi-name</xpath>
      </variable-assignment>
    </module-descriptor>
  </module-override>
  <config-root>c:/myapps/MyApp</config-root>
</deployment-plan>
```

An example of a default, common scenario of a production install using WLS tools is shown below. Customer has used deployment tools to configure an application with a deployment plan, and either the tools or their process has installed this application in a production domain following the application directory structure format. The only required argument for deployment is the install-root.

Tool usage:

java weblogic.Deployer-deploy-root/mydomain/config/deployments/MyApp

For the common simple case the AppDeploymentMBean for an EAR would look something like this in the config.xml

```
            <AppDeployment>
               <Name>MyApp</Name>
               <InstallDir>MyApp</InstallDir>
            </AppDeployment>
```

The in memory values of the AppDeploymentMBean would be:

```
            Name = Myapp
            InstallDir = MyApp
            SourcePath = app/MyApp.ear
            PlanDir = plan
            PlanPath = plan.xml
```

With the relative implicits for path calculation:

```
            Name = Myapp
            InstallDir = ${DOMAIN}/config/deployments/MyApp
            SourcePath = ${InstallDir}/app/MyApp.ear
            PlanDir = ${InstallDir}/plan
            PlanPath = ${PlanDir}/plan.xml
```

If one converted all of the above paths to full paths they would be:

```
InstallDir
=c:/weblogic/dev/sandbox/griffith/domains/mydomain/config/deployments/
myapp
SourcePath =
c:/weblogic/dev/sandbox/griffith/domains/mydomain/config/deployments/
myapp/app/MyApp.ear
PlanDir =
c:/weblogic/dev/sandbox/griffith/domains/mydomain/config/deployments/
myapp/plan
PlanPath =
c:/weblogic/dev/sandbox/griffith/domains/mydomain/config/deployments/
myapp/plan/plan.xml
```

The distribution settings affect this configuration as follows:
Stage
    The same directory format is distributed from the AS to the target MS, the path's that are resolvable on the AS are the same as they are on the MS
External-stage
    The system of the present invention does not distribute, some other system is responsible for distribution, but the paths that are resolvable on the AS are the same as they are on the MS
No-stage
    The system of the present invention does not distribute, the paths are expected to be resolvable on the targets, customer would have to share install-dir between targets or distribute the exact same path to all targets.

The example below illustrates a custom configuration of production application installation. The deployment tools were used to configure an application with a deployment plan, however the administrator has their own requirements for where their application and plan data live.

Tool usage:

```
java weblogic.Deployer -deploy -source c:/apps/dist/
     maypp.ear -plandir c:/configuration/plans
```

The config.xml would look like:

```
<AppDeployment>
    <Name>MyApp</Name>
    <SourcePath>c:/apps/dist/maypp.ear</SourcePath>
    <PlanDir>c:/configuration/plans</PlanDir>
</AppDeployment>
```

The in memory values of the AppDeploymentMBean would be:

```
Name = MyApp
InstallDir = null
SourcePath = c:/apps/dist/maypp.ear
PlanDir = c:/configuration/plans
PlanPath = plan.xml
```

If put in the relative implicits for path calculation:

```
Name = Myapp
InstallDir = null
SourcePath = c:/apps/dist/maypp.ear
PlanDir = c:/configuration/plans
PlanPath = ${PlanDir}/plan.xml
```

The distribution settings affect this configuration as follows:
Stage
    Paths on the AS are not necessarily required to be configured with an install-root, however when the deployment plan of the present invention distributes to the targets, it will place the artifacts into the install-root on the MS with the in-memory object having relative paths to match the install-root environment.
No-stage
    No distribution to the targets occurs, paths of SourcePath and PlanDir must be accessible on the targets. The administrator is responsible for either making the path available by either a shared file system, or by doing the distribution to the paths on each target
External-stage
    The two examples below illustrate a development scenario deploying to single server (Admin Server).

The Developer has built an archive using split-directory or an ant build within or outside of workshop. While developing the application the developer will not need or ever use a plan.

The below example illustrates a Development Iterative Dev cycle wherein there is no plan. Tool usage is the same as today:

```
java weblogic.Deployer -deploy -source c:/apps/dist/maypp.ear
ant:
    <wldeploy action="deploy" source="c:/apps/dist/maypp.ear"
    name="myapp" />
```

The config.xml would look like:

```
<AppDeployment>
    <Name>MyApp</Name>
    <SourcePath>c:/apps/dist/maypp.ear</SourcePath>
</AppDeployment>
```

The in memory values of the AppDeploymentMBean would be:

```
Name = MyApp
InstallDir = null
SourcePath = c:/apps/dist/maypp.ear
PlanDir = null
PlanPath = null
```

With the relative implicits for path calculation

```
Name = Myapp
InstallDir = null
SourcePath = c:/apps/dist/maypp.ear
PlanDir = null
PlanPath = null
```

The below example illustrates a Development Iterative Dev cycle having an export phase and involving creating a plan.

There is a phase in the dev cycle where the app is finished and prior to handing the app off to the next group in the lifecycle (qa/stage/production), a developer will want to create a plan and possibly deploy using their app's development configuration. Without discussing here the process of creating a plan, the scenario of deploying from development configuration with a plan is as follows. The plan is a src artifact so they do not use the install-dir, but keep the path to the application they have already been using and a path to the plandir.

Tool usage:

```
java weblogic.Deployer -deploy -source c:/apps/dist/maypp.ear -plandir
c:/mysrc/myapp/plan
<wldeploy action="deploy" source="c:/apps/dist/maypp.ear"
plandir="c:/mysrc/myapp/plan" name="myapp" />
```

The config.xml would look like:

```
<AppDeployment>
    <Name>MyApp</Name>
    <SourcePath>c:/apps/dist/maypp.ear</SourcePath>
    <PlanDir>c:/mysrc/myapp/plan</PlanDir>
</AppDeployment>
```

The in memory values of the AppDeploymentMBean would be:

```
Name = MyApp
InstallDir = null
SourcePath = c:/apps/dist/maypp.ear
PlanDir = c:/mysrc/myapp/plan
PlanPath = plan.xml
```

With the relative implicits for path calculation:

```
Name = Myapp
InstallDir = null
SourcePath = c:/apps/dist/maypp.ear
PlanDir = c:/mysrc/myapp/plan
PlanPath = ${PlanDir}/plan.xml
```

The following example illustrates a JSR-88 only tool using WLS SPI relating to Production. In one embodiment, an administrator may use the JSR-88 API directly and only use the WLS SPI of JSR-88. The creation of a Deployment Plan is done via:

DeploymentConfiguration.save(OutputStream outputArchive).

The model for saving JSR-88 configuration data is more than just the plan (written to the OutputStream). It also includes some possible number of external descriptors which may be written to a directory. Since JSR-88 only accommodates a single plan file and the distribute method DeploymentManager.distribute(Targettarget[]List,File moduleArchive, File deploymentPlan) does not account for a plan directory, the PlanDir is tracked in the AppDeploymentMBean as a separate path from the Plan Path. In the typical scenarios above, the Plan Dir is the root of the PlanPath, however in this case these two are distinct entities or two separate paths.

The config.xml will have resulted:

```
<AppDeployment>
    <Name>MyApp</Name>
    <SourcePath>c:/apps/dist/maypp.ear</SourcePath>
    <PlanDir>cC:/DOCUME~1/MARKGR~1/LOCALS~1/Temp/MyApp/
    plan</PlanDir>
    <PlanPath>c:/plans/myplan.xml</PlanPath>
</Appdeployment>
```

The in memory values of the AppDeploymentMBean would be:

```
Name = MyApp
InstallDir = null
SourcePath = c:/apps/dist/maypp.ear
PlanDir = C:/DOCUME~1/MARKGR~1/LOCALS~1/Temp/MyApp/plan
PlanPath = c:/plans/myplan.xml
```

The distribution settings affect this configuration as follows:

Stage

Since the administrators are using only pure JSR-88, they are not able to set WLS distribution settings. Thus, they will get the default distribution configuration which is stage. (Actually if the target list is a single server and it is the AS then the default mode is no-stage)

The present invention provides a deployment plan for an application server environment. In one embodiment, the deployment plan is an XML document that can be associated with any application that is deployed to an application server environment. The deployment plan may incorporate all server (vendor) specific deployment information as required by JSR-88 as well as the application configuration attributes that need to be resolved for each application server environment to which that application is deployed to. Additionally, it can contain references to custom module descriptors.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, providing a deployment plan for an application server system.

The invention claimed is:

1. A method for implementing a deployment plan for an application, the method comprising:
   receiving configuration information about the application, wherein the configuration information includes configuration descriptors for use with the application and at least one configuration attribute to be resolved for any environment in which the application is deployed;
   wherein each configuration descriptor includes a plurality of changeable properties that are each either dynamic or non-dynamic, and wherein dynamic properties can be modified at runtime without losing state information;
   creating a deployment plan for the application by indicating the configuration information and incorporating the at least one configuration attribute to be resolved for any environment in which the application is deployed;
   storing the deployment plan to a plan directory, wherein the plan directory is a first subdirectory of an install root directory, and storing the application to an app directory, wherein the app directory is a second subdirectory of the install root directory; and
   using the install root directory, together with the plan directory and the app directory to install instances of the application into an environment, wherein the installation of the instances includes resolving the at least one configuration attribute and wherein changes to reflect the resolved at least one configuration attribute are made to the deployment plan instead of the configuration descriptors, by indicating new values for at least one changeable property.

2. The method of claim 1, wherein storing the deployment plan to a plan directory, wherein the plan directory is a subdirectory of an install root directory, and storing the application to an app directory, wherein the app directory is another subdirectory of the install root directory comprises:
   storing at least one of a plurality of descriptors with the deployment plan.

3. The method of claim 1, wherein creating a deployment plan for the application by indicating the configuration information and incorporating the at least one configuration attribute to be resolved for any environment in which the application is deployed comprises:
   formatting the deployment plan as an Extensible Markup Language (XML) document.

4. The method of claim 1, further comprising:
   modifying at least one changeable property by defining variables in a variable section of the deployment plan wherein the variable section of the deployment plan contains a formatted list of name-value pairs of changeable properties of descriptors and variables; and
   exporting an application deployed on a development application server domain to at least one of a staging domain or a production domain based upon the deployment plan.

5. The method of claim 1, further comprising:
   installing an application instance based upon a deployment plan, comprising:
      retrieving the deployment plan from the plan directory; and
      deploying at least one application stored in the app directory based upon the deployment plan.

6. The method of claim 5, wherein deploying at least one application stored in the app directory based upon the deployment plan includes:
   retrieving at least one descriptor stored with the deployment plan;
   configuring external behavior of the application instance being installed based upon the at least one descriptor.

7. A machine-readable medium carrying one or more sequences of instructions for implementing a deployment plan for an application, which instructions, when executed by one or more processors, cause the one or more processors to carry out the steps of:
   receiving configuration information about the application, wherein the configuration information includes configuration descriptors for use with that application, and at least one configuration attribute to be resolved for any environment in which the application is deployed;
   wherein each configuration descriptor includes a plurality of changeable properties that are each either dynamic or non-dynamic, and wherein dynamic properties can be modified at runtime without losing state information;
   creating a deployment plan for the application by indicating the configuration information and incorporating the at least one configuration attribute to be resolved for any environment in which the application is deployed;
   storing the deployment plan to a plan directory, wherein the plan directory is a first subdirectory of an install root directory, and storing the application to an app directory, wherein the app directory is a second subdirectory of the install root directory; and
   using the install root directory, together with the plan directory and the app directory to install instances of the application into an environment, wherein the installation of the instances include resolving the at least one configuration attribute and wherein changes to reflect the resolved at least one configuration attribute are made to the deployment plan instead of the configuration descriptors, by indicating new values for at least one changeable property.

8. The machine-readable medium of claim 7, wherein the instructions for storing the deployment plan to a plan directory, wherein the plan directory is a subdirectory of an install root directory, and storing the application to an app directory, wherein the app directory is another subdirectory of the install root directory comprises:

storing at least one of a plurality of descriptors with the deployment plan.

9. The machine-readable medium of claim 7, wherein the instructions for creating a deployment plan for the application by indicating the configuration information and incorporating the at least one configuration attribute to be resolved for any environment in which the application is deployed comprises:

formatting the deployment plan as an Extensible Markup Language (XML) document.

10. The machine-readable medium of claim 7, further comprising instructions that, when executed by one or more processors, cause the one or more processors to carry out the step of:

modifying at least one changeable property by defining variables in a variable section of the deployment plan wherein the variable section of the deployment plan contains a formatted list of name-value pairs of changeable properties of descriptors and variables; and exporting an application deployed on a development application server domain to at least one of a staging domain or a production domain based upon the deployment plan.

11. The machine-readable medium of claim 7, further comprising instructions that, when executed by one or more processors, cause the one or more processors to carry out the step of:

installing an application instance based upon a deployment plan, comprising: retrieving the deployment plan from the plan directory; and deploying at least one application stored in the app directory based upon the deployment plan.

12. The machine-readable medium of claim 11, wherein the instructions for deploying at least one application stored in the app directory based upon the deployment plan include instructions that, when executed by one or more processors, cause the one or more processors to carry out the step of:

retrieving at least one descriptor stored with the deployment plan;

configuring external behavior of the application instance being installed based upon the at least one descriptor.

13. An apparatus for deploying an application in an application server cluster, the apparatus comprising:

a processor; and one or more stored sequences of instructions which, when executed by the processor, cause the processor to carry out the steps of:

receiving configuration information about the application, wherein the configuration information includes configuration descriptors for use with that application, and at least one configuration attribute to be resolved for any environment in which the application is deployed;

wherein each configuration descriptor includes a plurality of changeable properties that are each either dynamic or non-dynamic, and wherein dynamic properties can be modified at runtime without losing state information;

creating a deployment plan for the application by indicating the configuration information and incorporating the at least one configuration attribute to be resolved for any environment in which the application is deployed storing the deployment plan to a plan directory, wherein the plan directory is a first subdirectory of an install root directory, and storing the application to an app directory, wherein the app directory is a second subdirectory of the install root directory; and using the install root directory, together with the plan directory and the app directory to install instances of the application into an environment, wherein the installation of the instances include resolving the at least one configuration attribute and wherein changes to reflect the resolved at least one configuration attribute are made to the deployment plan instead of the configuration descriptors, by indicating new values for at least one changeable property.

14. A method for deploying an application to an environment for the application using a deployment plan comprising: receiving configuration information about an application including at least one descriptor, wherein each descriptor includes a plurality of changeable properties that are each either dynamic or non-dynamic, and wherein dynamic properties can be modified at runtime without losing state information; storing the at least one descriptor in an app directory which is a subdirectory of an install root directory; creating a deployment plan based on the configuration information, wherein the deployment plan includes a plurality of variable assignments; defining the variable assignments to include information specific to an environment for the application; automatically querying for secondary descriptors; if any secondary descriptors are found, incorporating the secondary descriptors into the deployment plan; storing the deployment plan in a plan directory and storing the secondary descriptors in the plan directory which is another subdirectory of the install root directory; overriding at least one changeable property in the descriptor by at least one variable assignment in the deployment plan with information specific to the environment and wherein the descriptor is unmodified; parsing the at least one descriptor; applying the at least one variable assignment from the deployment plan during the parsing step; and deploying the application to the environment.

15. The method of claim 14 further comprising:

creating a second deployment plan based on the deployment plan and the configuration information;

wherein the second deployment plan includes a second plurality of variable assignments;

defining the variable assignments to include information specific to a second environment for the application;

overriding at least one changeable property in the descriptor by at least one variable assignment in the second deployment plan with information specific to the second environment and wherein the descriptor is unmodified; and deploying the application to the second environment using the second deployment plan.

* * * * *

UNITED STATES PATENT AND TRADEMARK OFFICE
CERTIFICATE OF CORRECTION

| | | |
|---|---|---|
| PATENT NO. | : 7,526,764 B2 | Page 1 of 1 |
| APPLICATION NO. | : 10/848422 | |
| DATED | : April 28, 2009 | |
| INVENTOR(S) | : Stephen R. Fanshier | |

It is certified that error appears in the above-identified patent and that said Letters Patent is hereby corrected as shown below:

On the face page, item (56), under "Other Publications", in column 1, line 1, delete "Assmbling" and insert -- Assembling --, therefor.

In column 3, line 29, delete "Plan Dir" and insert -- PlanDir --, therefor.

In column 4, line 38, delete "Application's" and insert -- application's --, therefor.

In column 8, lines 14-15, delete "WebLogicDeploymentconfiguration" and insert -- WebLogicDeploymentConfiguration --, therefor.

In column 9, line 7, delete "applicationCthe" and insert -- application of the --, therefor.

In column 15, line 64, delete "(Targettarget[]List,File" and insert -- Target[]targetList, File --, therefor.

In column 15, line 67, delete "Plan Path" and insert -- PlanPath --, therefor.

In column 16, line 1, delete "Plan Dir" and insert -- PlanDir --, therefor.

In column 20, line 8, in claim 13, after "deployed" insert -- ; --.

Signed and Sealed this

Twenty-fifth Day of May, 2010

David J. Kappos
*Director of the United States Patent and Trademark Office*